Patented Nov. 5, 1940

2,220,289

UNITED STATES PATENT OFFICE 2,220,289

METHOD OF TREATING CALCIUM SULPHATE

Harold F. Saunders, Chicago, Ill., and Clovis H. Adams, Coffeyville, Kans., assignors to The Sherwin-Williams Company, Cleveland, Ohio, a corporation of Ohio No Drawing. Application November 22, 1937, Serial No. 175,878

3 Claims. (Cl. 134—58)

This invention relates to a method of treating calcium sulphate to effect decolorization thereof and to improve its adaptability for use as a pigment and extender in paints.

Calcium sulphate is of considerable value as an ingredient of paints and coating compositions and as an extending pigment or filler in the paint, paper, textile, rubber and other industries, largely on account of its relatively high bulking value, or volume per pound of pigment, as compared with barium sulphate or other similar extenders.

It is of especial value in paint formulations when used in combination with high opacity pigments, such as zinc sulphide or titanium oxide, the calcium sulphate contributing not only bulk, but certain favorable characteristics such as easy brushability, good feel and body, and durability to the paint.

The hydrous forms of calcium sulphate, either as precipitated from solutions of calcium salts by a sulphate, or naturally occurring, as gypsum, when used in paints are inclined to thixotropic structure and puffiness, due to the water present. Consequently, such hydrous calcium sulphates are preferably dehydrated and fixed in an insoluble form known as b-anhydrite by calcining at a temperature above 500° C. to remove this objectionable characteristic.

The natural crystalline forms of calcium sulphate have been found to be definitely superior to precipitated calcium sulphate in paint mixtures because they produce paints of better durability on exposure to the weather, better flow, leveling and sheen or lustre. Unfortunately the natural spar calcium sulphates are always found associated with more or less iron, and upon calcination develop an undesirable pinkish color. Iron will also be found in precipitated calcium sulphate unless the solutions from which it is made are carefully purified. Such discolored calcined calcium sulphate cannot be used in the manufacture of white paints and it is the object of this invention to provide a method of treatment that will not only effect decolorization, but will also overcome objectionable characteristics, from the standpoint of an oil paint pigment, which are possessed by calcium sulphate which has been decolorized by methods heretofore known.

We are aware of Durgin's proposal as disclosed in United States Patent 1,783,417, to effect decolorization by the use of phosphate salts, preferably mono-calcium phosphate, in the manufacture of dental plastics, and we are also aware of Marsh's proposal, as disclosed in United States Patent 2,031,898 for producing a whitening effect by the addition of sulphuric acid to gypsum prior to calcination for the purpose of neutralizing calcium and magnesium carbonate, in the production of plasters and cements. We have found, by extensive experimentation with the Durgin and Marsh proposals that, while they produce a good whitening effect, the resulting products, when utilized as an ingredient of an oil paint, produce paints of such poor drying properties and which result in such soft films that they were very unsatisfactory. We have also experimented with the Durgin and Marsh processes by subjecting the same material to these processes in succession and in different orders, but found that while in some cases the color value was improved, the objectionable characteristics, from the standpoint of an oil paint pigment, such as poor drying properties and soft films, were still present in the final product.

We have discovered that by treating calcium sulphate, prior to calcination, with a mixture of one molar weight of tricalcium phosphate and one, two or three molar weights of sulphuric acid, in quantity depending upon the amount of contaminating iron present, and then calcining at a temperature above 500° C., a product may be obtained which not only possesses superior brightness and whiteness, but can be used in paints without developing retarded drying or soft films. We have also found that similar results may be obtained by the use of a mixture of sulphuric acid and magnesium phosphate or the phosphates of the other alkaline earth metals.

The principle involved, it is believed, is that the iron impurities are converted to sulphate by the sulphuric acid, which iron sulphate is then combined with a portion of the phosphate to produce a complex iron-alkaline earth metal phosphate of low tinctorial value and liberation of sulphuric acid. It is believed that this liberated sulphuric acid converts the remaining alkaline earth metal phosphate to the alkaline earth metal sulphate and phosphoric acid, and the phosphoric acid is decomposed and volatilized in the calcination. Consequently, there will be neither free sulphuric acid nor acid alkaline earth metal phosphate in the calcined product and it is probably the presence of one or both of these substances in the final products that produces the retarded drying, since by their elimination this objectionable characteristic, from the standpoint of a paint pigment, is overcome.

The quantity of the mixture of the phosphate plus the sulphuric acid required to produce both whiteness and freedom from retarded drying in paint formulations is, of course, dependent upon the quantity of iron contamination present in the particular calcium sulphate used. In our preferred practice of the invention we use a quantity of the mixture very slightly less than that required to combine with all of the iron, since a minute amount of iron remaining in the calcined product will not produce a visible or undesirable degree of discolor, rather than to exceed the quantity just sufficient to combine with all of the iron present. This is because it is both more economical to use a quantity slightly less than that required to combine with the iron, and the danger of leaving acid phosphate or free sulphuric acid in the final product is lessened. While the whiteness is not materially improved by an excess of the mixture, the drying properties are considerably reduced thereby and proportionately to the excess. For the general run of high grade selected gypsum rock, not highly contaminated with iron, we have found that between 1% and 3%, by weight, of the mixed phosphate and sulphuric acid is sufficient to effect the desired result, although the amount of the mixture to be used must, in all cases, be determined by the degree of iron contamination and the amount of the mixture may run as high as 20% or as low as one-fourth of 1%.

In our preferred practice we mix the finely divided tricalcium phosphate with the finely divided gypsum or precipitated calcium sulphate and to this mixture add the sulphuric acid while continuing the mixing without heating. This mixture is then calcined at a temperature of 500° C. or higher. In this practice we prefer to use one molar weight of tricalcium phosphate to two molar weights of sulphuric acid but these proportions are subject to variation within the scope of the invention. The proportion of sulphuric acid, for instance, may be reduced to as low as one molar weight to one of the tricalcium phosphate in some cases with quite good results. Increase of acid above the preferred proportion does not appear to help much, if any, and may be dangerous practice if the increase is greatly over the iron equivalent.

As an alternative practice we admix tricalcium phosphate and sulphuric acid in the proportion of one molar weight of the former to two molar weights of the latter. The mixing is carried out without heating, in order to retard their mutual reaction as much as possible. The mixture is then well worked into the finely pulverized gypsum rock or precipitated calcium sulphate prior to its calcination at a temperature of 500° C. or higher.

It is our theory, although we do not wish to be bound by this theory as in any way limiting the invention, that when one molar weight of tricalcium phosphate is reacted with one, two or three molar weights of sulphuric acid in the presence of a calcium sulphate contaminated with iron compounds as impurities, the iron compounds are taken into combination with the calcium as a complex calcium-iron phosphate which is more resistant to heat than the acid calcium phosphate formed by the reaction by calcium in excess of that required to form the calcium-iron complex salt. According to this view or theory, the treated calcium material would contain additional calcium sulphate formed by the reaction, a calcium-iron complex phosphate, and either an acid calcium phosphate with an equivalent of free sulphuric acid or calcium sulphate plus phosphoric acid. When the treated material is subjected to heating to a temperature of 500° C. or more, as in the calcination step, the calcium-iron complex salt is sufficiently resistant to heat to retain its low tinctorial value or is decomposed to other products of similarly low tinctorial value, while the calcium phosphates are decomposed by the sulphuric acid present to calcium sulphate and free phosphoric acid which is driven off from the product.

Regardless of the correctness of our theory as to the reactions that take place, there results a product of superior whiteness which is free from the objectionable characteristics, from the standpoint of an oil paint pigment, of a calcium sulphate treated either by a phosphate or sulphuric acid alone, these objectionable characteristics being retarded drying and the production of soft tacky films.

We have found, by experiment, that the results which we obtain by our novel process are not due to or obtainable by calcination of the calcium sulphate in the presence of phosphoric acid alone, and that when a calcium sulphate contaminated with iron is mixed with phosphoric acid and calcined there is very little improvement in color and, for this reason, the material so treated is not suitable for use as a white paint pigment.

Having thus described our invention, we claim:

1. In a process for producing a white calcium sulphate pigment from a hydrous calcium sulphate which is contaminated with iron, the steps of incorporating into said hydrous calcium sulphate from 0.25 to 20% of an alkaline earth metal phosphate and sulphuric acid without heating, the amount of said phosphate and said acid being determined by the amount of iron present and being slightly less than the amount required to react with all of the iron present, and then calcining the resulting intermediate product at a temperature not substantially less than 500° C.

2. In a process for producing a white calcium sulphate pigment from a hydrous calcium sulphate which is contaminated with iron, the steps of incorporating into said hydrous calcium sulphate from 0.25 to 20% of an alkaline earth metal phosphate and sulphuric acid in the proportion of one molar weight of said phosphate to not over three molar weights of said acid without heating, the amount of said phosphate and said acid being determined by the amount of iron present and being not in excess of that required to react with all of the iron present, and then calcining the resulting intermediate product at a temperature not substantially below 500° C.

3. In a process for producing a white calcium sulphate pigment from a hydrous calcium sulphate which is contaminated with iron, the steps of incorporating into said hydrous calcium sulphate from 0.25 to 20% of tricalcium phosphate and sulphuric acid in the proportion of one molar weight of said phosphate to not over three molar weights of said acid without heating, the amount of said phosphate and said acid being determined by the amount of iron present and being not in excess of that required for reaction with all of the iron present, and then calcining the resulting intermediate product at a temperature not substantially below 500° C.

HAROLD F. SAUNDERS.
CLOVIS H. ADAMS.